US012752761B2

(12) United States Patent
Lee et al.

(10) Patent No.: US 12,752,761 B2
(45) Date of Patent: Oct. 6, 2026

(54) BRAKE SYSTEM AND METHOD OF CONTROLLING THE SAME

(71) Applicant: HL MANDO CORPORATION, Pyeongtaek-si (KR)

(72) Inventors: Yongwoo Lee, Pyeongtaek-si (KR); Jonghyun Yoon, Pyeongtaek-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 19/193,689

(22) Filed: Apr. 29, 2025

(65) Prior Publication Data

US 2026/0152162 A1 Jun. 4, 2026

(30) Foreign Application Priority Data

Nov. 29, 2024 (KR) ........................ 10-2024-0175207

(51) Int. Cl.
*B60T 13/74* (2006.01)
*B60T 17/18* (2006.01)

(52) U.S. Cl.
CPC ............ *B60T 13/741* (2013.01); *B60T 17/18* (2013.01); *B60T 2270/413* (2013.01)

(58) Field of Classification Search
CPC ... B60T 13/741; B60T 17/18; B60T 2270/413
USPC ........................................................... 701/70
See application file for complete search history.

(56) References Cited

U.S. PATENT DOCUMENTS

| | | | | |
|---|---|---|---|---|
| 11,648,917 B2 * | 5/2023 | Satoh | ...................... | B60T 13/74 188/72.1 |
| 2022/0242379 A1 | 8/2022 | Kim et al. | | |
| 2024/0101089 A1 * | 3/2024 | Kim | ........................ | B60T 13/58 |
| 2025/0091559 A1 * | 3/2025 | Bechmann | ............. | B60T 7/042 |

FOREIGN PATENT DOCUMENTS

| | | |
|---|---|---|
| EP | 4155143 A1 | 3/2023 |
| KR | 20220124795 A | 9/2022 |

* cited by examiner

*Primary Examiner* — Hai H Huynh
(74) *Attorney, Agent, or Firm* — Seed Intellectual Property Law Group LLP

(57) ABSTRACT

A brake system may include an electromechanical brake provided in a wheel of a vehicle, an electromechanical brake controller configured to perform braking control on the electromechanical brake, a first controller electrically connected to the electromechanical brake controller or configured to communicate with the electromechanical brake controller, and a second controller electrically connected to the electromechanical brake controller or configured to communicate with the electromechanical brake controller, in which the first and second controllers are alternately activated on the basis of generation of an ignition-on signal of the vehicle and alternately operate as a master controller for controlling the electromechanical brake controller and maintain an inactive state as a slave controller.

20 Claims, 4 Drawing Sheets

BRAKE SYSTEM AND METHOD OF CONTROLLING THE SAME

CROSS-REFERENCE TO RELATED APPLICATIONS

This application claims the priority of Korean Patent Application No. 10-2024-0175207 filed on Nov. 29, 2024, in the Korean Intellectual Property Office, the disclosure of which is incorporated herein by reference.

BACKGROUND

Technical Field

The disclosed disclosure relates to a brake system and a method of controlling the same.

Description of the Related Art

A vehicle is essentially equipped with a brake system for braking the vehicle. With the development of technologies, various types of brake systems have been proposed to provide safety for a driver and a passenger.

An electromechanical brake system (EMB) has been developed as an alternative to a hydraulic brake system. Various electric constituent elements, such as a sensor, an actuator, and a controller, and various mechanical constituent elements are applied together to the electromechanical brake system, such that the electromechanical brake system has faster responsiveness and enables precise control in comparison with the hydraulic brake system. In addition, there is an advantage in that the electromechanical brake system may be integrated with a vehicle safety system and an advanced driver assistance system (ADAS).

However, the fact that the electromechanical brake system depends on electrical constituent elements and control causes a disadvantage in that the electromechanical brake system may be vulnerable to an electrical defect or an erroneous operation, and the disadvantage may lead to damage to safety and performance of a vehicle.

Therefore, there is a need to develop a technology capable of ensuring safety and reliability of the electromechanical brake system so that the electromechanical brake system may perform a braking function even in case that an electrical defect or an erroneous operation occurs on some constituent elements of the electromechanical brake system.

BRIEF SUMMARY

One aspect of the disclosed disclosure may provide a brake system, which includes a backup constituent element so that the brake system may perform a braking function even when some constituent elements fail or an erroneous operation occurs, and a method of controlling the same.

One aspect of the disclosed disclosure may provide a brake system, in which dual-type controllers are applied to utilize redundancy, and a dynamic master-slave switching mechanism is applied to improve stability and reliability, and a method of controlling the same.

One aspect of the disclosed disclosure provides a brake system including: an electromechanical brake provided in a wheel of a vehicle; an electromechanical brake controller configured to perform braking control on the electromechanical brake; a first controller electrically connected to the electromechanical brake controller or configured to communicate with the electromechanical brake controller; and a second controller electrically connected to the electromechanical brake controller or configured to communicate with the electromechanical brake controller, in which the first controller and the second controller are alternately activated on the basis of generation of an ignition-on signal of the vehicle and alternately operate as a master controller for controlling the electromechanical brake controller and maintain an inactive state as a slave controller.

The first controller may operate as the master controller or maintain the inactive state on the basis of first generation history information of the ignition-on signal of the vehicle pre-stored in a first memory of the first controller when the ignition-on signal is generated, and the second controller may operate as the master controller or maintain the inactive state on the basis of second generation history information of the ignition-on signal of the vehicle pre-stored in a second memory of the second controller when the ignition-on signal is generated.

The first generation history information and the second generation history information may include at least one of information on a total number of generations of the ignition-on signal of the vehicle, information on whether the total number of generations is an even number or an odd number, and operation history information indicating that the master controller or the slave controller is operated upon generating the ignition-on signal immediately before the generation of the ignition-on signal.

The first controller may operate as the master controller when information, which indicates that the total number of generations of the ignition-on signal of the vehicle is the odd number, is pre-stored in the first memory, and the second controller may maintain the inactive state when information, which indicates that the total number of generations of the ignition-on signal of the vehicle is the odd number, is pre-stored in the second memory.

The first controller may maintain the inactive state when information, which indicates that the total number of generations of the ignition-on signal of the vehicle is the even number, is pre-stored in the first memory, and the second controller may operate as the master controller when information, which indicates that the total number of generations of the ignition-on signal of the vehicle is the even number, is pre-stored in the second memory.

The first controller may maintain the inactive state when operation history information, which indicates that the first controller operates as the master controller, is pre-stored in the first memory, and the first controller may operate as the master controller when operation history information, which indicates that the first controller operates as the slave controller, is pre-stored in the first memory.

The second controller may maintain the inactive state when operation history information, which indicates that the second controller operates as the master controller, is pre-stored in the second memory, and the second controller may operate as the master controller when operation history information, which indicates that the second controller operates as the slave controller, is pre-stored in the second memory.

The first controller may update the first generation history information pre-stored in the first memory on the basis of the generation of the ignition-on signal, and the second controller may update the second generation history information pre-stored in the second memory on the basis of the generation of the ignition-on signal.

The first controller may operate as the master controller or maintain the inactive state on the basis of information received from a controller of the vehicle in accordance with the generation of the ignition-on signal, and the second controller may operate as the master controller or maintain the inactive state on the basis of information received from the controller of the vehicle in accordance with the generation of the ignition-on signal.

The information received from the controller of the vehicle by each of the first controller and the second controller may include at least one of generation history information of the ignition-on signal of the vehicle, current date information, and corresponding role information, the generation history information of the ignition-on signal of the vehicle may include at least one of information on a total number of generations of the ignition-on signal of the vehicle and information on whether the total number of generations of the ignition-on signal of the vehicle is an even number or an odd number, and the corresponding role information may include role information that requests the master controller or the slave controller to be operated.

The first controller may operate as the master controller when the current date information, which corresponds to an odd-numbered date or an odd-numbered week, is received from the controller of the vehicle, and the second controller may maintain the inactive state when the current date information, which corresponds to the odd-numbered date or the odd-numbered week, is received from the controller of the vehicle.

The first controller may maintain the inactive state when the current date information, which corresponds to an even-numbered date or an even-numbered week, is received from the controller of the vehicle, and the second controller may operate as the master controller when the current date information, which corresponds to the even-numbered date or the even-numbered week, is received from the controller of the vehicle.

When one of the first controller and the second controller, which operates as the master controller, is inoperable, the other of the first controller and the second controller may control the electromechanical brake controller.

Another aspect of the disclosed disclosure provides a method of controlling a brake system, which includes an electromechanical brake provided in a wheel of a vehicle, an electromechanical controller configured to perform braking control on the electromechanical brake, and a first controller and a second controller electrically connected to the electromechanical controller or configured to communicate with the electromechanical controller, the method including: identifying, by the first controller and the second controller, generation of an ignition-on signal of the vehicle; and allowing the first controller and the second controller to be alternately activated on the basis of the generation of the ignition-on signal and alternately operate as a master controller for controlling the electromechanical brake controller and maintain an inactive state as a slave controller.

The first controller may operate as the master controller or maintain the inactive state on the basis of first generation history information of the ignition-on signal of the vehicle pre-stored in a first memory of the first controller when the ignition-on signal is generated, and the second controller may operate as the master controller or maintain the inactive state on the basis of second generation history information of the ignition-on signal of the vehicle pre-stored in a second memory of the second controller when the ignition-on signal is generated.

The first generation history information and the second generation history information may include at least one of information on a total number of generations of the ignition-on signal of the vehicle, information on whether the total number of generations of the ignition-on signal of the vehicle is an even number or an odd number, and operation history information indicating that the master controller or the slave controller is operated upon generating the ignition-on signal immediately before the generation of the ignition-on signal.

The method may further include: updating, by the first controller, the first generation history information of the ignition-on signal of the vehicle pre-stored in the first memory of the first controller on the basis of the generation of the ignition-on signal; and updating, by the second controller, the second generation history information of the ignition-on signal of the vehicle pre-stored in the second memory of the second controller on the basis of the generation of the ignition-on signal.

The method may include: allowing the first controller to operate as the master controller or maintain the inactive state on the basis of information received from a controller of the vehicle in accordance with the generation of the ignition-on signal; and allowing the second controller to operate as the master controller or maintain the inactive state on the basis of information received from the controller of the vehicle in accordance with the generation of the ignition-on signal.

The information received from the controller of the vehicle by each of the first controller and the second controller may include at least one of generation history information of the ignition-on signal of the vehicle, current date information, and corresponding role information, the generation history information of the ignition-on signal of the vehicle may include at least one of information on a total number of generations of the ignition-on signal of the vehicle and information on whether the total number of generations of the ignition-on signal of the vehicle is an even number or an odd number, and the corresponding role information may include role information that requests the master controller or the slave controller to be operated.

When one of the first controller and the second controller, which operates as the master controller, is inoperable, the other of the first controller and the second controller may control the electromechanical brake controller.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
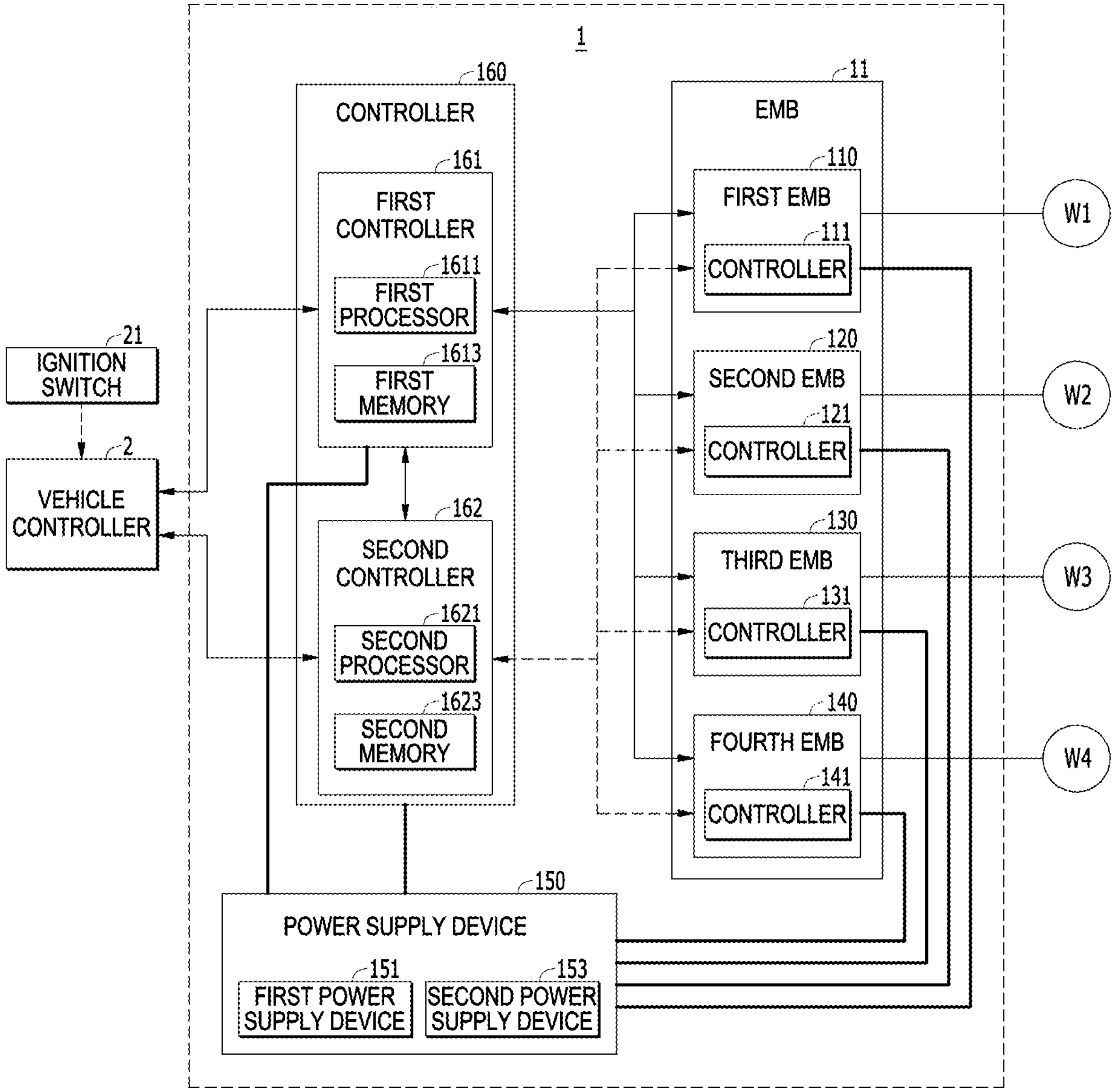
FIG. 1 is a block diagram of a brake system according to an embodiment.

Like reference numerals refer to like components throughout the specification. This specification does not describe all the components of the embodiments, and duplicative contents between embodiments or general contents in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

Because a failure of a brake system may lead to a loss of a braking control function and/or a vehicle accident, redundancy in the brake system may be an important factor in maintaining safety and reliability of a vehicle. In the case of a brake-by-wire system that controls a brake electronically, there is always the possibility of an electrical defect or an erroneous operation. Therefore, the redundancy in the brake-by-wire system may be particularly important.

The redundancy in the brake system is considered to include a backup constituent element (or backup system) so that the brake system may continuously perform the braking function even in the event of a failure or an erroneous operation. In other words, the redundant brake system may provide a fail-safe mechanism so that the vehicle may safely stop even if one constituent element or a sub-system.

In consideration of these points, an embodiment of the disclosed disclosure is intended to provide a brake system having newly designed redundancy, and a method of controlling the same.

More specifically, the embodiment of the disclosed disclosure may provide a new brake system and a method of controlling the same, the brake system being configured to ensure a continuous control function without a single point of failure, like a brake system in the related art that includes a master controller and a slave controller, and including controllers that switch roles by applying a dynamic master and slave switching technology, unlike the brake system in the related art.

For example, the brake system in the embodiment of the disclosed disclosure may include a plurality of controllers, e.g., first and second controllers, and the first and second controllers may each be configured as a completely independent controller (e.g., a microcontroller unit (MCU)) with its own processing ability and memory, thereby providing redundancy.

In addition, in the embodiment of the disclosed disclosure, the roles of the first and second controllers, i.e., the role of the master controller and the role of the slave controller may be dynamically switched in accordance with a designated condition. Therefore, a workload may be uniformly distributed to the first and second controllers, and the stability of the brake system may be ultimately improved.

Hereinafter, operation principles and embodiments of the disclosed disclosure will be described in detail with reference to the accompanying drawings.

Figure 2:
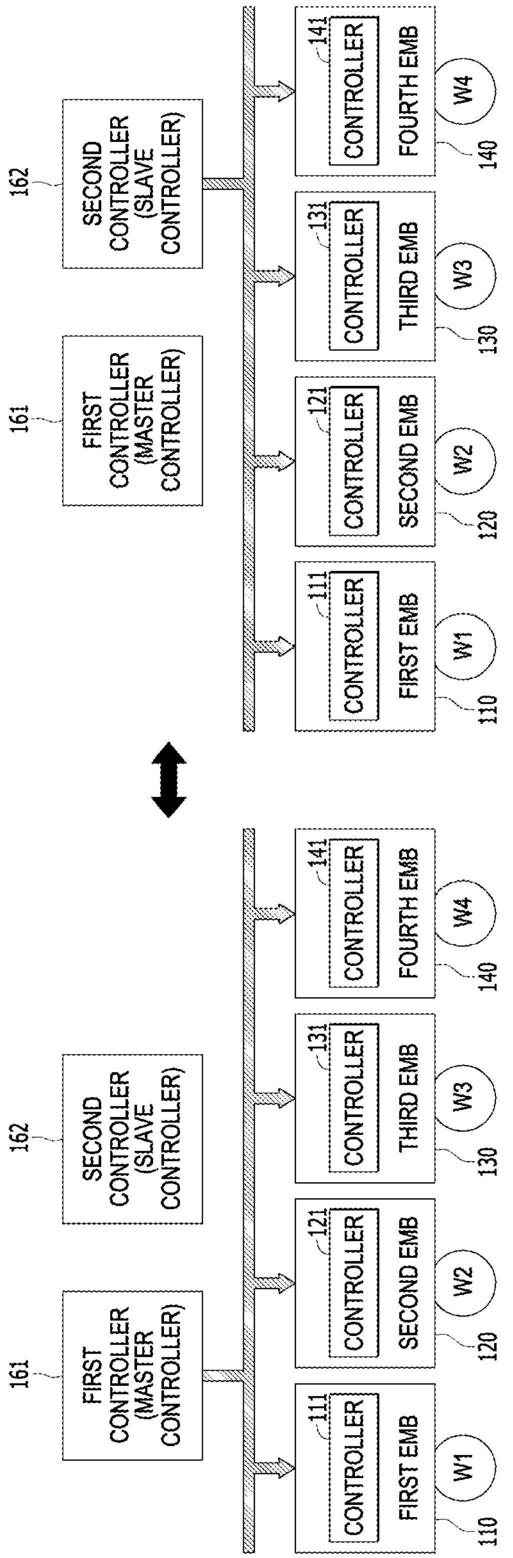
FIG. 2 is a view for explaining an operation of the brake system according to the embodiment.

FIG. 1 is a block diagram of the brake system according to the embodiment. FIG. 2 is a view for explaining an operation of the brake system according to the embodiment.

With reference to FIG. 1, a brake system 1 may include electromechanical brakes 11 provided in wheels of a vehicle and configured to stop rotations of the corresponding wheels, one or more power supply devices 150 configured to supply power to the brake system 1, and/or controllers 160 configured to control the brake system 1.

The electromechanical brakes 11 may include a first electromechanical brake 110 configured to brake or release a first wheel w1, a second electromechanical brake 120 configured to brake or release a second wheel w2, a third electromechanical brake 130 configured to brake or release a third wheel w3, and/or a fourth electromechanical brake 140 configured to brake or release a fourth wheel w4.

For example, the first wheel w1 and the second wheel w2 may be front wheels, and the third wheel w3 and the fourth wheel w4 may be rear wheels.

The first to fourth electromechanical brakes 110, 120, 130, and 140 may each be configured to be operated by an electromechanical force, i.e., configured to generate a braking force by generating a clamping force by means of a motor and a mechanical part in order to brake the corresponding wheels. Additionally, although not illustrated, one or more force sensors may be provided in each of the first to fourth electromechanical brakes 110, 120, 130, and 140 to detect a clamping force.

For example, the first to fourth electromechanical brakes 110, 120, 130, and 140 may each be a caliper type or drum type brake.

The caliper type brake may include a pair of pad plates installed to press a brake disc configured to rotate together with each of the corresponding wheels, a caliper housing configured to operate the pair of pad plates, a piston installed in the caliper housing and configured to advance or retract, a power conversion unit configured to receive rotational driving power for moving a piston, convert the rotational driving power into linear driving power, and transmit the linear driving power to the piston, and/or a brake motor configured to generate the rotational driving power for moving the piston.

The drum type brake may include a pair of brake shoes each having an arc shape and installed to be movable along a surface of a backing plate coupled to a vehicle body, a drum having a friction surface at an inner peripheral side thereof and configured to rotate together with the corresponding wheel of the vehicle, and/or an electric actuator configured to apply a force to the brake shoes in a direction in which the pair of brake shoes are expanded. The electric actuator may include a motor, a speed reducer, and/or a pressing mechanism.

The first electromechanical brake 110 may include a controller 111 (or also referred to as a 'first electromechanical brake controller') configured to control the first electromechanical brake 110, the second electromechanical brake 120 may include a controller 121 (or also referred to as a 'second electromechanical brake controller') configured to control the second electromechanical brake 120, the third electromechanical brake 130 may include a controller 131 (or also referred to as a 'third electromechanical brake controller') configured to control the third electromechanical brake 130, and the fourth electromechanical brake 140 may include a controller 141 (or also referred to as a 'fourth electromechanical brake controller') configured to control the fourth electromechanical brake 140.

The power supply device 150 may be provided as a single power supply device 150 or a plurality of power supply devices 150 and supply power to constituent elements of the brake system 1, e.g., the electromechanical brakes 11 (e.g., the controllers 111, 121, 131, and 141) and/or the controllers 160.

The power supply devices 150 may include a first power supply device 151 and a second power supply device 153.

The first power supply device 151 may supply power to a first controller 161 and/or a second controller 162 and also supply power to the first to fourth electromechanical brakes 110, 120, 130, and 140.

The second power supply device 153 may supply power to the first controller 161 and/or the second controller 162 and also supply power to the first to fourth electromechanical brakes 110, 120, 130, and 140.

For example, when any one of the first power supply device 151 and the second power supply device 153 cannot operate, the other of the first power supply device 151 and the second power supply device 153 may implement redundancy of a power source configured to supply power to the constituent elements of the brake system 1.

The first power supply device 151 and the second power supply device 153 may include separate power circuits configured to provide power from different batteries or include separate power circuits separated from one battery.

For example, although not illustrated, the first power supply device 151 may include a first battery and/or a first power circuit configured to provide power from the first battery, and the second power supply device 153 may include a second battery provided separately from the first battery, and a second power circuit configured to provide power from the second battery. As another example, although not illustrated, the first power supply device 151 and the second power supply device 153 may respectively include the first and second power circuits configured to provide power from a single battery.

The controllers 160 may include the first controller 161 and the second controller 162 and implement the redundancy of the controllers.

The first controller 161 may be electrically connected to or communicate with the electromechanical brakes 11, the power supply devices 150, a vehicle controller 2, an external sensor (not illustrated), and/or other external devices (not illustrated). For example, although not illustrated in FIG. 1, the first controller 161 may include a communication circuit.

The first controller 161 may include a first processor 1611 and a first memory 1613. The first controller 161 may be a microcontroller unit (MCU).

The first processor 1611 may process a received signal. In response to the signal, the first processor 1611 may output control signals for performing braking control or braking release control on the electromechanical brakes 11, i.e., the first electromechanical brake 110, the second electromechanical brake 120, the third electromechanical brake 130, and/or the fourth electromechanical brake 140.

The first memory 1613 may store or memorize programs and data for implementing operations of controlling the components included in the brake system 1. The first memory 1613 may provide the stored programs and data to the processor 1611 and memorize temporary data generated during the operation of the processor 1611.

The first memory 1613 may store generation history information (or also referred to as 'first generation history information') of an ignition-on signal of the vehicle.

The first generation history information may store information on the total number of generations of the ignition-on signal of the vehicle, information on whether the total number of generations of the ignition-on signal of the vehicle is an even number or an odd number, and/or history information of an operation performed by the master controller or the slave controller at the time of an ignition-on occurrence immediately before the generation of the ignition-on signal for a current operation of the vehicle.

The first memory 1613 may include a non-volatile memory, such as a read-only memory (ROM), an erasable programmable read-only memory (EPROM), an electrically erasable programmable read-only memory (EEPROM), and/or a flash memory. Additionally, the first memory 1613 may further include a volatile memory, such as a static random access memory (S-RAM) and/or a dynamic random access memory (D-RAM), The second controller 162 may be electrically connected to or communicate with the electromechanical brakes 11, the power supply devices 150, the vehicle controller 2, the external sensor (not illustrated), and/or other external devices (not illustrated). For example, although not illustrated in FIG. 1, the second controller 162 may include a communication circuit.

The second controller 162 may include a second processor 1621 and a second memory 1623. The second controller 162 may be a microcontroller unit.

The second processor 1621 may process a received signal. In response to the signal, the second processor 1621 may output control signals for performing braking control or braking release control on the electromechanical brakes 11, i.e., the first electromechanical brake 110, the second electromechanical brake 120, the third electromechanical brake 130, and/or the fourth electromechanical brake 140.

The second memory 1623 may store or memorize programs and data for implementing operations of controlling the components included in the brake system 1. The second memory 1623 may provide the stored programs and data to the processor 1621 and memorize temporary data generated during the operation of the processor 1621.

The second memory 1623 may store generation history information (or also referred to as 'second generation history information') of an ignition-on signal of the vehicle.

The second generation history information may store information on the total number of generations of the ignition-on signal of the vehicle, information on whether the total number of generations of the ignition-on signal of the vehicle is an even number or an odd number, and/or history information of an operation performed by the master controller or the slave controller at the time of an ignition-on occurrence immediately before the generation of the ignition-on signal for a current operation of the vehicle.

The second memory 1623 may include a non-volatile memory, such as a read-only memory (ROM), an erasable programmable read-only memory (EPROM), an electrically erasable programmable read-only memory (EEPROM), and/or a flash memory. Additionally, the second memory 1623 may further include a volatile memory, such as a static random access memory (S-RAM) and/or a dynamic random access memory (D-RAM), With reference to FIG. 2, roles of the first controller 161 and the second controller 162, i.e., roles of the master controller or the slave controller may be dynamically switched so that the first controller 161 and the second controller 162 operate in a balanced manner at similar rates and ensure continuous redundancy.

For example, the second controller 162 may operate as the slave controller in case that the first controller 161 operates as the master controller, and the second controller 162 may operate as the master controller in case that the first controller 161 operates as the slave controller.

The first controller 161 may control the controllers 111, 121, 131, and 141 so that the controllers 111, 121, 131, and 141 of the electromechanical brakes 110, 120, 130, and 140 may control the corresponding electromechanical brakes 110, 120, 130, and 140 when the first controller 161 operates as the master controller.

The second controller 162 may control the controllers 111, 121, 131, and 141 so that the controllers 111, 121, 131, and 141 of the electromechanical brakes 110, 120, 130, and 140 may control the corresponding electromechanical brakes 110, 120, 130, and 140 when the second controller 162 operates as the master controller.

The first controller 161 may maintain an inactive state when the first controller 161 operates as the slave controller.

The second controller 162 may maintain an inactive state when the second controller 162 operates as the slave controller.

The first controller 161 and the second controller 162 may operate in different roles on the basis of the generation of the ignition-on signal of the vehicle, that is, i.e., start-on of the vehicle.

The first controller 161 and the second controller 162 may identify the generation of the ignition-on signal of the vehicle.

For example, the first controller 161 and the second controller 162 may each identify whether an ignition switch 21 is turned on, i.e., identify the generation of the ignition-on signal of the vehicle on the basis of the reception of the signal from the vehicle controller 2 or the reception of the ignition-on signal from the ignition switch 21. As another example, the first controller 161 and the second controller 162 may each identify the generation of the ignition-on signal of the vehicle on the basis of a supplied voltage. In addition, the first controller 161 and the second controller 162 may identify the generation of the ignition-on signal of the vehicle by utilizing other technologies in the related art.

For example, the roles of the first and second controllers 161 and 162 may be switched for each cycle of the generation of the ignition-on signal of the vehicle, i.e., each cycle in which the vehicle is turned on.

At the time of the generation of the ignition-on signal of the vehicle, the first controller 161 may operate as the master controller or maintain the inactive state as the slave controller on the basis of the first generation history information of the ignition-on signal of the vehicle pre-stored in the first memory 1613.

At the time of the generation of the ignition-on signal of the vehicle, the second controller 162 may operate as the master controller or maintain the inactive state as the slave controller on the basis of the second generation history information of the ignition-on signal of the vehicle pre-stored in the second memory 1623.

The first controller 161 may operate as the master controller in case that information, which indicates that the total number of generations of the ignition-on signal of the vehicle is an odd number, is stored in the first memory 1613. The first controller 161 may operate as the slave controller in case that information, which indicates that the total number of generations of the ignition-on signal of the vehicle is an even number, is stored in the first memory 1613.

The second controller 162 may operate as the slave controller in case that information, which indicates that the total number of generations of the ignition-on signal of the vehicle is an odd number, is stored in the second memory 1623. The second controller 162 may operate as the master controller in case that information, which indicates that the total number of generations of the ignition-on signal of the vehicle is an even number, is stored in the second memory 1623.

At the time of the generation of the ignition-on signal of the vehicle, the first controller 161 may operate as the slave controller in case that operation history information, which indicates that the master controller is operated at the time of the generation of the ignition-on signal immediately before the generation of the ignition-on signal, is stored in the first memory 1613. At the time of the generation of the ignition-on signal of the vehicle, the first controller 161 may operate as the master controller in case that operation history information, which indicates that the slave controller is operated at the time of the generation of the ignition-on signal immediately before the generation of the ignition-on signal, is stored in the first memory 1613.

At the time of the generation of the ignition-on signal of the vehicle, the second controller 162 may operate as the slave controller in case that operation history information, which indicates that the master controller is operated at the time of the generation of the ignition-on signal immediately before the generation of the ignition-on signal, is stored in the second memory 1623. At the time of the generation of the ignition-on signal of the vehicle, the second controller 162 may operate as the master controller in case that operation history information, which indicates that the slave controller is operated at the time of the generation of the ignition-on signal immediately before the generation of the ignition-on signal, is stored in the second memory 1623.

The first controller 161 may update the first generation history information of the ignition-on signal of the vehicle pre-stored in the first memory 1613 on the basis of the generation of the ignition-on signal of the vehicle. For example, the first controller 161 may update the first generation history information of the ignition-on signal of the vehicle pre-stored in the first memory 1613 after determining whether to perform the role of the master controller or whether to perform the role of the slave controller.

On the basis of the generation of the ignition-on signal of the vehicle, the first controller 161 may increase the pre-stored total number of generations of the ignition-on signal of the vehicle by 1 and store the total number of generations of the ignition-on signal of the vehicle in the first memory 1613.

In case that the pre-stored total number of generations of the ignition-on signal of the vehicle is an even number, the first controller 161 may change the total number of generations of the ignition-on signal of the vehicle to an odd number on the basis of the generation of the ignition-on signal of the vehicle and store the total number of generations of the ignition-on signal of the vehicle in the first memory 1613. Alternatively, in case that the pre-stored total number of generations of the ignition-on signal of the vehicle is an odd number, the first controller 161 may change the total number of generations of the ignition-on signal of the vehicle to an even number on the basis of the generation of the ignition-on signal of the vehicle and store the total number of generations of the ignition-on signal of the vehicle in the first memory 1613.

The first controller 161 may change the operation history information, which indicates that the master controller is operated at the time of the ignition-on occurrence immediately before the pre-stored generation of the ignition-on signal of the vehicle, to the operation history information, which indicates that the slave controller is operated, on the basis of the generation of the ignition-on signal of the vehicle and store the operation history information in the first memory 1613. Alternatively, the first controller 161 may change the operation history information, which indicates that the slave controller is operated at the time of the ignition-on occurrence immediately before the pre-stored generation of the ignition-on signal of the vehicle, to the operation history information, which indicates that the master controller is operated, on the basis of the generation of the ignition-on signal of the vehicle and store the operation history information in the first memory 1613.

The second controller 162 may update the second generation history information of the ignition-on signal of the vehicle pre-stored in the second memory 1623 on the basis of the generation of the ignition-on signal of the vehicle. For example, the second controller 162 may update the second generation history information of the ignition-on signal of the vehicle pre-stored in the second memory 1623 after determining whether to perform the role of the master controller or whether to perform the role of the slave controller.

On the basis of the generation of the ignition-on signal of the vehicle, the second controller 162 may increase the pre-stored total number of generations of the ignition-on signal of the vehicle by 1 and store the total number of generations of the ignition-on signal of the vehicle in the second memory 1623.

In case that the pre-stored total number of generations of the ignition-on signal of the vehicle is an even number, the second controller 162 may change the total number of generations of the ignition-on signal of the vehicle to an odd number on the basis of the generation of the ignition-on signal of the vehicle and store the total number of generations of the ignition-on signal of the vehicle in the second memory 1623. Alternatively, in case that the pre-stored total number of generations of the ignition-on signal of the vehicle is an odd number, the second controller 162 may change the total number of generations of the ignition-on signal of the vehicle to an even number on the basis of the generation of the ignition-on signal of the vehicle and store the total number of generations of the ignition-on signal of the vehicle in the second memory 1623.

The second controller 162 may change the operation history information, which indicates that the master controller is operated at the time of the ignition-on occurrence immediately before the pre-stored generation of the ignition-on signal of the vehicle, to the operation history information, which indicates that the slave controller is operated, on the basis of the generation of the ignition-on signal of the vehicle and store the operation history information in the second memory 1623. Alternatively, the second controller 162 may change the operation history information, which indicates that the slave controller is operated at the time of the ignition-on occurrence immediately before the pre-stored generation of the ignition-on signal of the vehicle, to the operation history information, which indicates that the master controller is operated, on the basis of the generation of the ignition-on signal of the vehicle and store the operation history information in the second memory 1623.

The first controller 161 and the second controller 162 may be alternately activated on the basis of the generation of the ignition-on signal of the vehicle and alternately operate as the master controller for controlling the electromechanical brake controllers 111, 121, 131, and 141 and as the slave controller while maintaining the inactive state.

As another example, the roles of the first and second controllers 161 and 162 may be switched on the basis of the information received from the vehicle controller 2 in accordance with the generation of the ignition-on signal of the vehicle.

The information received by the first controller 161 and the second controller 162 from the vehicle controller 2 may include the generation history information of the ignition-on signal of the vehicle and/or current date information.

The generation history information of the ignition-on signal of the vehicle may include the information on the total number of generations of the ignition-on signal of the vehicle, the information on whether the total number of generations of the ignition-on signal of the vehicle is an even number or an odd number, and/or the operation history information indicating that the master controller or the slave controller is operated at the time of the ignition-on occurrence immediately before the generation of the ignition-on signal of the vehicle.

The first controller 161 may operate as the master controller in case that the information, which indicates that the total number of generations of the ignition-on signal of the vehicle is an odd number, is received from the vehicle controller 2 on the basis of the generation of the ignition-on signal of the vehicle. The first controller 161 may operate as the slave controller in case that the information, which indicates that the total number of generations of the ignition-on signal of the vehicle is an even number, is received from the vehicle controller 2 on the basis of the generation of the ignition-on signal of the vehicle.

The second controller 162 may operate as the slave controller in case that the information, which indicates that the total number of generations of the ignition-on signal of the vehicle is an odd number, is received from the vehicle controller 2 on the basis of the generation of the ignition-on signal of the vehicle. The second controller 162 may operate as the master controller in case that the information, which indicates that the total number of generations of the ignition-on signal of the vehicle is an even number, is received from the vehicle controller 2 on the basis of the generation of the ignition-on signal of the vehicle.

In case that the information received by the first controller 161 and the second controller 162 from the vehicle controller 2 in accordance with the generation of the ignition-on signal is the current date information, the first controller 161 and the second controller 162 may be alternately activated on the basis of the generation of the ignition-on signal of the vehicle and alternately operate as the master controller for controlling the electromechanical brake controllers 111, 121, 131, and 141 and as the slave controller while maintaining the inactive state in accordance with the date information.

The first controller 161 may operate as the slave controller in case that the operation history information, which indicates that the first controller 161 operates as the master controller, is received from the vehicle controller 2 on the basis of the generation of the ignition-on signal of the vehicle. The first controller 161 may operate as the master controller in case that the operation history information, which indicates that the first controller 161 operates as the slave controller, is received from the vehicle controller 2 on the basis of the generation of the ignition-on signal of the vehicle. In this case, the operation history information may mean the operation history information of the first controller 161 immediately before the current generation of the ignition-on signal of the vehicle.

The second controller 162 may operate as the slave controller in case that the operation history information, which indicates that the second controller 162 operates as the master controller, is received from the vehicle controller 2 on the basis of the generation of the ignition-on signal of the vehicle. The second controller 162 may operate as the master controller in case that the operation history information, which indicates that the second controller 162 operates as the slave controller, is received from the vehicle controller 2 on the basis of the generation of the ignition-on signal of the vehicle. In this case, the operation history information may mean the operation history information of the second controller 162 immediately before the current generation of the ignition-on signal of the vehicle.

The first controller 161 and the second controller 162 may determine whether to perform the role of the master controller or the slave controller and then transfer the corresponding information to the vehicle controller 2.

Meanwhile, the vehicle controller 2 may randomly determine the roles of the first and second controllers 161 and 162 by utilizing a random technology in the related art on the basis of the generation of the ignition-on signal of the vehicle and transfer information, which requests the first and second controllers 161 and 162 to perform the determined roles, to the first and second controllers 161 and 162.

Therefore, the first controller 161 may operate as the master controller in case that the information, which requests the first controller 161 to operate as the master controller, is received from the vehicle controller 2 and operate as the slave controller in case that the information, which requests the first controller 161 to operate as the slave controller, is received from the vehicle controller 2.

In addition, the second controller 162 may operate as the master controller in case that the information, which requests the second controller 162 to operate as the master controller, is received from the vehicle controller 2 and operate as the slave controller in case that the information, which requests the second controller 162 to operate as the slave controller, is received from the vehicle controller 2.

The first controller 161 and the second controller 162 may be electrically connected to or communicate with each other.

Because the first controller 161 and the second controller 162 are electrically connected to or communicate with each other, the second controller 162 may identify the inoperability of the first controller 161 in the event of the inoperability of the first controller 161. In addition, the first controller 161 may identify the inoperability of the second controller 162 in the event of the inoperability of the second controller 162.

Therefore, in the event of the inoperability of the first controller 161, the second controller 162 may control the controllers 111, 121, 131, and 141 of the electromechanical brakes 110, 120, 130, and 140 even in case that the second controller 162 is the slave controller. In addition, in the event of the inoperability of the second controller 162, the first controller 161 may control the controllers 111, 121, 131, and 141 of the electromechanical brakes 110, 120, 130, and 140 even in case that the first controller 161 is the slave controller.

Meanwhile, the above-mentioned embodiments have been described in which the first controller 161 operates as the master controller in case that the first generation history information pre-stored in the first memory 1613 is the information corresponding to the odd number, and the second controller 162 maintains the inactive state in case that the second generation history information pre-stored in the second memory 1623 is the information corresponding to the odd number. In addition, the above-mentioned embodiments have been described in which the first controller 161 maintains the inactive state when the first generation history information pre-stored in the first memory 1613 is the information corresponding to the even number, and the second controller 162 operates as the master controller in case that the second generation history information pre-stored in the second memory 1623 is the information corresponding to the even number.

However, according to another embodiment, the first controller 161 may operate as the master controller in case that the first generation history information pre-stored in the first memory 1613 is the information corresponding to the even number, and the second controller 162 may maintain the inactive state in case that the second generation history information pre-stored in the second memory 1623 is the information corresponding to the even number. In addition, the first controller 161 may maintain the inactive state when the first generation history information pre-stored in the first memory 1613 is the information corresponding to the odd number, and the second controller 162 may operate as the master controller in case that the second generation history information pre-stored in the second memory 1623 is the information corresponding to the odd number.

In addition, a condition of the first generation history information pre-stored in the first memory 1613 and a condition of the second generation history information pre-stored in the second memory 1623, which are determined so that the first controller 161 operates as the master controller and the second controller 162 operates as the slave controller or the first controller 161 operates as the slave controller and the second controller 162 operates as the master controller, may be variously changed and designated by a user or developer.

The above-mentioned embodiments have been described in which the first controller 161 operates as the master controller in case that the information received from the vehicle controller 2 is the current date information corresponding to an odd-numbered date or an odd-numbered week, and the second controller 162 maintains the inactive state in case that the information received from the vehicle controller 2 is the current date information corresponding to an odd-numbered date or an odd-numbered week. In addition, the above-mentioned embodiments have been described in which the first controller 161 maintains the inactive state in case that the information received from the vehicle controller 2 is the current date information corresponding to an even-numbered date or an even-numbered week, and the second controller 162 operates as the master controller in case that the information received from the vehicle controller 2 is the current date information corresponding to an even-numbered date or an even-numbered week.

However, according to another embodiment, the first controller 161 may operate as the master controller in case that the information received from the vehicle controller 2 is the current date information corresponding to the even-numbered date or the even-numbered week, and the second controller 162 may maintain the inactive state in case that the information received from the vehicle controller 2 is the current date information corresponding to the even-numbered date or the even-numbered week. In addition, the first controller 161 may maintain the inactive state in case that the information received from the vehicle controller 2 is the current date information corresponding to the odd-numbered date or the odd-numbered week, and the second controller 162 may operate as the master controller in case that the information received from the vehicle controller 2 is the current date information corresponding to the odd-numbered date or the odd-numbered week.

Additionally, according to another embodiment, the first controller 161 may operate as the master controller in case that the information received from the vehicle controller 2 is the current date information corresponding to an odd-numbered month, and the second controller 162 may maintain an inactive state in case that the information received from the vehicle controller 2 is the current date information corresponding to an odd-numbered month. In addition, the first controller 161 maintains the inactive state in case that the information received from the vehicle controller 2 is the current date information corresponding to an even-numbered month, and the second controller 162 may operate as the master controller in case that the information received from the vehicle controller 2 is the current date information corresponding to an even-numbered month.

In addition, a condition of the information received from the vehicle controller 2, which is determined so that the first controller 161 operates as the master controller and the second controller 162 operates as the slave controller or the first controller 161 operates as the slave controller and the second controller 162 operates as the master controller, may be variously changed and designated by the user or developer.

Figure 3:
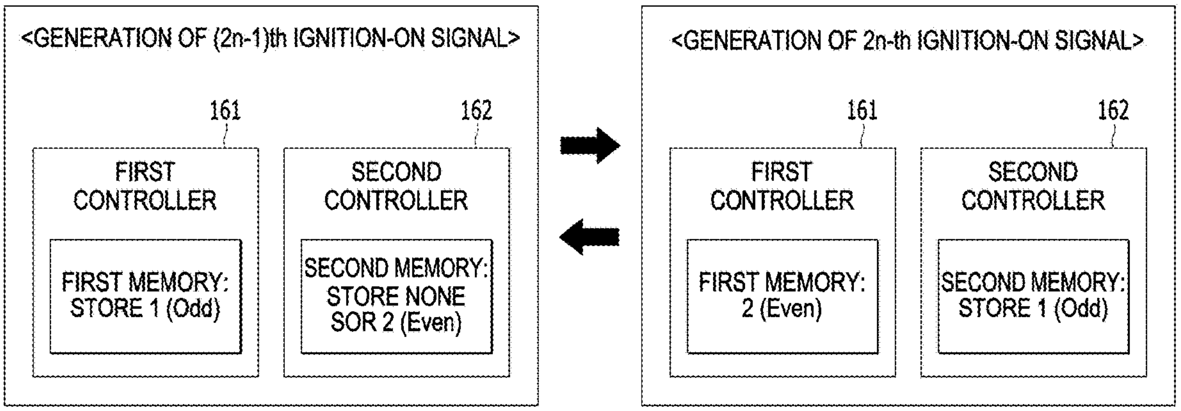
FIG. 3 is a view for explaining operations of first and second controllers according to the embodiment.

FIG. 3 is a view for explaining the operations of the first and second controllers 161 and 162 according to the embodiment.

With reference to FIG. 3, at the time of (2n-1)th (n is an integer) generation of the ignition-on signal, i.e., the start-on of the vehicle, the first controller 161 may operate as the master controller and store 1, which corresponds to an odd number (Odd), in the first memory 1613. For example, although not illustrated, in case that 2, which corresponds to an even number (Even), is pre-stored in the first memory 1613, the first controller 161 may change 2 to 1 and store 1 in the first memory 1613.

At the time of the (2n-1)th (n is an integer) generation of the ignition-on signal of the vehicle, the second controller 162 may be in the inactive state as the slave controller. In this case, no information (none) may be stored in the second memory 1623, or 2, which corresponds to an even number (Even), may be stored in the second memory 1623.

At the time of the 2n-th generation of the ignition-on signal, i.e., the start-on of the vehicle, the first controller 161 may be in the inactive state as the slave controller. In this case, 2, which corresponds to an even number, may be stored in the first memory 1613.

At the time of the 2n-th generation of the ignition-on signal of the vehicle, the second controller 162 may operate as the master controller and store 1, which corresponds to an odd number (Odd), in the second memory 1623. For example, although not illustrated, in case that 2, which corresponds to an even number (Even), is pre-stored in the second memory 1623, the second controller 162 may change 2 to 1 and store 1 in the second memory 1623.

According to the embodiment in FIG. 3, it can be seen that regular utilization and synchronization of the first controller 161 and the second controller 162 may be facilitated as the roles of the first and second controllers 161 and 162 are switched in accordance with the ignition-off of the vehicle, i.e., the generation of an ignition-off signal of the vehicle.

Figure 4:
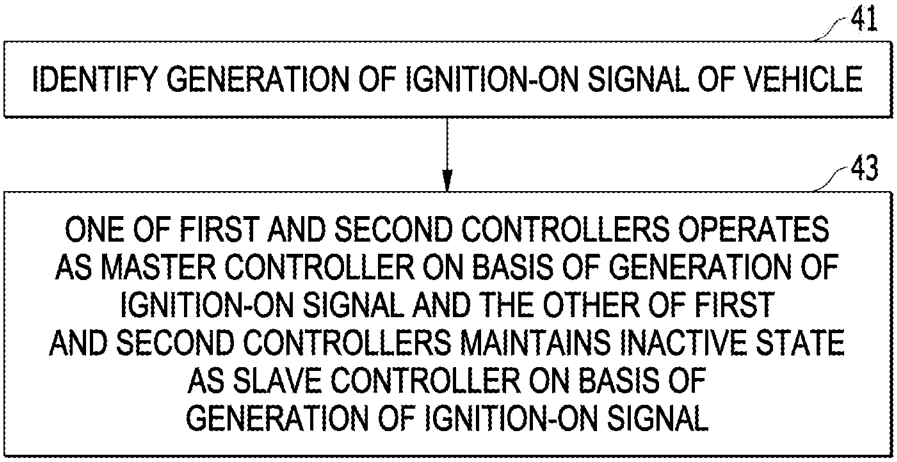
FIG. 4 is a flowchart illustrating the operations of the first and second controllers of the brake system according to the embodiment.

FIG. 4 is a flowchart of the operations of the first and second controllers 161 and 162 of the brake system 1 according to the embodiment.

With reference to FIG. 4, the first controller 161 and the second controller 162 may identify the generation of the ignition-on signal of the vehicle (401).

One of the first controller 161 and the second controller 162 may operate as the master controller and control the electromechanical brake controller on the basis of the generation of the ignition-on signal, and the other of the first controller 161 and the second controller 162 may maintain the inactive state as the slave controller on the basis of the generation of the ignition-on signal (43).

For example, at the time of the generation of the ignition-on signal, the first controller 161 may operate as the master controller or maintain the inactive state on the basis of the first generation history information of the ignition-on signal of the vehicle pre-stored in the first memory 1613. In addition, at the time of the generation of the ignition-on signal, the second controller 162 may operate as the master controller or maintain the inactive state as the slave controller on the basis of the second generation history information of the ignition-on signal of the vehicle pre-stored in the second memory 1623.

Additionally, the first controller 161 may update the first generation history information pre-stored in the first memory 1613 on the basis of the generation of the ignition-on signal. In addition, the second controller 162 may update the second generation history information pre-stored in the second memory 1623 on the basis of the generation of the ignition-on signal.

As another example, the first controller 161 may operate as the master controller or maintain the inactive state on the basis of the information received from the vehicle controller 2 in accordance with the generation of the ignition-on signal. In addition, the second controller 162 may operate as the master controller or maintain the inactive state on the basis of the information received from the vehicle controller 2 in accordance with the generation of the ignition-on signal.

Additionally, the first controller 161 may transfer information, which indicates whether the first controller 161 operates as the master controller or the slave controller, to the vehicle controller 2. In addition, the second controller 162 may transfer information, which indicates whether the second controller 162 operates as the master controller or the slave controller, to the vehicle controller 2.

In addition to the embodiment in FIG. 4, in the event of the inoperability of one of the controllers that has operated as the master controller, the other of the controllers may operate as the master controller.

According to the above-mentioned embodiment, the first controller 161 and the second controller 162 may be alternately activated on the basis of the generation of the ignition-on signal of the vehicle and alternately operate as the master controller for controlling the electromechanical brake controllers 111, 121, 131, and 141 and as the slave controller while maintaining the inactive state.

According to the above-mentioned embodiment, in case that the information received by the first controller 161 and the second controller 162 from the vehicle controller 2 in accordance with the generation of the ignition-on signal is the current date information, the first controller 161 and the second controller 162 may be alternately activated on the basis of the generation of the ignition-on signal of the vehicle and alternately operate as the master controller for controlling the electromechanical brake controllers 111, 121, 131, and 141 and as the slave controller while maintaining the inactive state in accordance with the date information.

According to the above-mentioned embodiment, it is possible to provide the flexibility of the roles by switching the roles of the first and second controllers 161 and 162. In addition, according to the above-mentioned embodiment, it is possible to solve the problem in the related art in which the master controller is fixed, and the slave controller does not operate until the corresponding master controller comes into an inoperable state, which shortens the lifespan of the master controller.

The brake system 1 and the method of controlling the same according to the above-mentioned embodiment may provide a new technology capable of performing the stable braking operation even in the event of failures of some constituent elements of the brake system 1 and erroneous operations.

For example, the brake system 1 and the method of controlling the same may improve the vehicle safety by continuously ensuring the braking function of the brake system under various operational conditions without interruption. In addition, the brake system 1 and the method of controlling the same may improve overall vehicle reliability and customer satisfaction by minimizing a risk of an accident caused by a failure of the brake system 1.

The brake system 1 and the method of controlling the same according to the above-mentioned embodiment may provide a new technology capable of providing the first controller 161 and the second controller 162, smoothly switching the roles of the first and second controllers 161 and 162, ensuring the redundancy, and continuously operating the brake system 1 even in the event of a failure of any one controller.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

The invention claimed is:

1. A brake system comprising:

an electromechanical brake provided in a wheel of a vehicle;

an electromechanical brake controller configured to perform braking control on the electromechanical brake;

a first controller electrically connected to the electromechanical brake controller or configured to communicate with the electromechanical brake controller; and a second controller electrically connected to the electromechanical brake controller or configured to communicate with the electromechanical brake controller, wherein the first controller and the second controller are alternately activated on the basis of generation of an ignition-on signal of the vehicle and alternately operate as a master controller for controlling the electromechanical brake controller and maintain an inactive state as a slave controller.

2. The brake system of claim 1, wherein the first controller operates as the master controller or maintains the inactive state on the basis of first generation history information of the ignition-on signal of the vehicle pre-stored in a first memory of the first controller when the ignition-on signal is generated, and the second controller operates as the master controller or maintains the inactive state on the basis of second generation history information of the ignition-on signal of the vehicle pre-stored in a second memory of the second controller when the ignition-on signal is generated.

3. The brake system of claim 2, wherein the first generation history information and the second generation history information include at least one of information on a total number of generations of the ignition-on signal of the vehicle, information on whether the total number of generations is an even number or an odd number, and operation history information indicating that the master controller or the slave controller is operated upon generating the ignition-on signal immediately before the generation of the ignition-on signal.

4. The brake system of claim 3, wherein the first controller operates as the master controller when information, which indicates that the total number of generations of the ignition-on signal of the vehicle is the odd number, is pre-stored in the first memory, and the second controller maintains the inactive state when information, which indicates that the total number of generations of the ignition-on signal of the vehicle is the odd number, is pre-stored in the second memory.

5. The brake system of claim 4, wherein the first controller maintains the inactive state when information, which indicates that the total number of generations of the ignition-on signal of the vehicle is the even number, is pre-stored in the first memory, and the second controller operates as the master controller when information, which indicates that the total number of generations of the ignition-on signal of the vehicle is the even number, is pre-stored in the second memory.

6. The brake system of claim 3, wherein the first controller maintains the inactive state when operation history information, which indicates that the first controller operates as the master controller, is pre-stored in the first memory, and the first controller operates as the master controller when operation history information, which indicates that the first controller operates as the slave controller, is pre-stored in the first memory.

7. The brake system of claim 6, wherein the second controller maintains the inactive state when operation history information, which indicates that the second controller operates as the master controller, is pre-stored in the second memory, and the second controller operates as the master controller when operation history information, which indicates that the second controller operates as the slave controller, is pre-stored in the second memory.

8. The brake system of claim 3, wherein the first controller updates the first generation history information pre-stored in the first memory on the basis of the generation of the ignition-on signal, and the second controller updates the second generation history information pre-stored in the second memory on the basis of the generation of the ignition-on signal.

9. The brake system of claim 1, wherein the first controller operates as the master controller or maintains the inactive state on the basis of information received from a controller of the vehicle in accordance with the generation of the ignition-on signal, and the second controller operates as the master controller or maintains the inactive state on the basis of information received from the controller of the vehicle in accordance with the generation of the ignition-on signal.

10. The brake system of claim 9, wherein the information received from the controller of the vehicle by each of the first controller and the second controller includes at least one of generation history information of the ignition-on signal of the vehicle, current date information, and corresponding role information, wherein the generation history information of the ignition-on signal of the vehicle includes at least one of information on a total number of generations of the ignition-on signal of the vehicle and information on whether the total number of generations of the ignition-on signal of the vehicle is an even number or an odd number, and wherein the corresponding role information includes role information that requests the master controller or the slave controller to be operated.

11. The brake system of claim 10, wherein the first controller operates as the master controller when the current date information, which corresponds to an odd-numbered date or an odd-numbered week, is received from the controller of the vehicle, and the second controller maintains the inactive state when the current date information, which corresponds to the odd-numbered date or the odd-numbered week, is received from the controller of the vehicle.

12. The brake system of claim 11, wherein the first controller maintains the inactive state when the current date information, which corresponds to an even-numbered date or an even-numbered week, is received from the controller of the vehicle, and the second controller operates as the master controller when the current date information, which corresponds to the even-numbered date or the even-numbered week, is received from the controller of the vehicle.

13. The brake system of claim 1, wherein when one of the first controller and the second controller, which operates as the master controller, is inoperable, the other of the first controller and the second controller controls the electromechanical brake controller.

14. A method of controlling a brake system, which comprises an electromechanical brake provided in a wheel of a vehicle, an electromechanical controller configured to perform braking control on the electromechanical brake, and a first controller and a second controller electrically connected to the electromechanical controller or configured to communicate with the electromechanical controller, the method comprising:

identifying, by the first controller and the second controller, generation of an ignition-on signal of the vehicle; and allowing the first controller and the second controller to be alternately activated on the basis of the generation of the ignition-on signal and alternately operate as a master controller for controlling the electromechanical brake controller and maintain an inactive state as a slave controller.

15. The method of claim 14, wherein the first controller operates as the master controller or maintains the inactive state on the basis of first generation history information of the ignition-on signal of the vehicle pre-stored in a first memory of the first controller when the ignition-on signal is generated, and the second controller operates as the master controller or maintains the inactive state on the basis of second generation history information of the ignition-on signal of the vehicle pre-stored in a second memory of the second controller when the ignition-on signal is generated.

16. The method of claim 15, wherein the first generation history information and the second generation history information include at least one of information on a total number of generations of the ignition-on signal of the vehicle, information on whether the total number of generations of the ignition-on signal of the vehicle is an even number or an odd number, and operation history information indicating that the master controller or the slave controller is operated upon generating the ignition-on signal immediately before the generation of the ignition-on signal.

17. The method of claim 15, further comprising:

updating, by the first controller, the first generation history information of the ignition-on signal of the vehicle pre-stored in the first memory of the first controller on the basis of the generation of the ignition-on signal; and updating, by the second controller, the second generation history information of the ignition-on signal of the vehicle pre-stored in the second memory of the second controller on the basis of the generation of the ignition-on signal.

18. The method of claim 14, comprising:

allowing the first controller to operate as the master controller or maintain the inactive state on the basis of information received from a controller of the vehicle in accordance with the generation of the ignition-on signal; and allowing the second controller to operate as the master controller or maintain the inactive state on the basis of information received from the controller of the vehicle in accordance with the generation of the ignition-on signal.

19. The method of claim 18, wherein the information received from the controller of the vehicle by each of the first controller and the second controller includes at least one of generation history information of the ignition-on signal of the vehicle, current date information, and corresponding role information, wherein the generation history information of the ignition-on signal of the vehicle includes at least one of information on a total number of generations of the ignition-on signal of the vehicle and information on whether the total number of generations of the ignition-on signal of the vehicle is an even number or an odd number, and wherein the corresponding role information includes role information that requests the master controller or the slave controller to be operated.

20. The method of claim 14, wherein when one of the first controller and the second controller, which operates as the master controller, is inoperable, the other of the first controller and the second controller operates as the master controller.

* * * * *